United States Patent
Uchida

(10) Patent No.: US 7,043,239 B2
(45) Date of Patent: May 9, 2006

(54) DOWNLOAD AND DISPLAY OF SYSTEM TAGS IN WIRELESS COMMUNICATION SYSTEMS

(75) Inventor: Nobuyuki Uchida, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 344 days.

(21) Appl. No.: 10/315,690

(22) Filed: Dec. 9, 2002

(65) Prior Publication Data

US 2004/0204136 A1 Oct. 14, 2004

(51) Int. Cl.
*H04Q 7/20* (2006.01)

(52) U.S. Cl. .............................. 455/432.1; 455/432.2; 455/435.2

(58) Field of Classification Search ................ 455/403, 455/422.1, 432.1, 436, 434, 550.1, 552.1, 455/435.1, 414.1, 500; 370/328, 320, 329, 370/345, 431, 442
See application file for complete search history.

(56) References Cited

U.S. PATENT DOCUMENTS

| | | | |
|---|---|---|---|
| 5,444,765 A * | 8/1995 | Marui et al. .............. | 455/432.1 |
| 5,590,397 A | 12/1996 | Kojima | |
| 5,761,618 A * | 6/1998 | Lynch et al. ................ | 455/419 |
| 5,812,950 A * | 9/1998 | Tom ........................... | 455/440 |
| 5,950,130 A | 9/1999 | Coursey | |
| 6,148,197 A * | 11/2000 | Bridges et al. ........... | 455/432.3 |
| 6,195,532 B1 | 2/2001 | Bamburak et al. | |
| 6,223,042 B1 * | 4/2001 | Raffel ......................... | 455/455 |
| 6,259,917 B1 * | 7/2001 | Elzein ....................... | 455/435.2 |
| 6,470,182 B1 * | 10/2002 | Nelson ..................... | 455/432.1 |
| 2001/0024953 A1 | 9/2001 | Balogh | |
| 2004/0022216 A1 * | 2/2004 | Shi ............................ | 370/335 |

FOREIGN PATENT DOCUMENTS

| | | |
|---|---|---|
| EP | 0781064 | 6/1997 |
| WO | 0147315 | 2/2001 |

* cited by examiner

*Primary Examiner*—Jean Gelin
(74) *Attorney, Agent, or Firm*—Philip R. Wadsworth; Thien T. Nguyen; Kam T. Tam

(57) ABSTRACT

Techniques for downloading and displaying system tags by wireless terminals based on roaming status. A tag includes texts and/or graphics. The system tags include home system tags and roaming system tags, which include group tags and specific tags. A home system tag is associated with one or multiple home systems, a group tag is associated with one or multiple roaming indicator values, and a specific tag is associated with one or multiple SID values. A terminal is provided with home system tag, group tags, and specific tags. The terminal displays the home system tag when obtaining service from the home system and a roaming system tag when obtaining service from a roaming system. The particular roaming system tag to be displayed is dependent on the roaming indicator value and the SID value for the roaming system. The system tags may be downloaded to the terminal via over-the-air signaling.

4 Claims, 10 Drawing Sheets

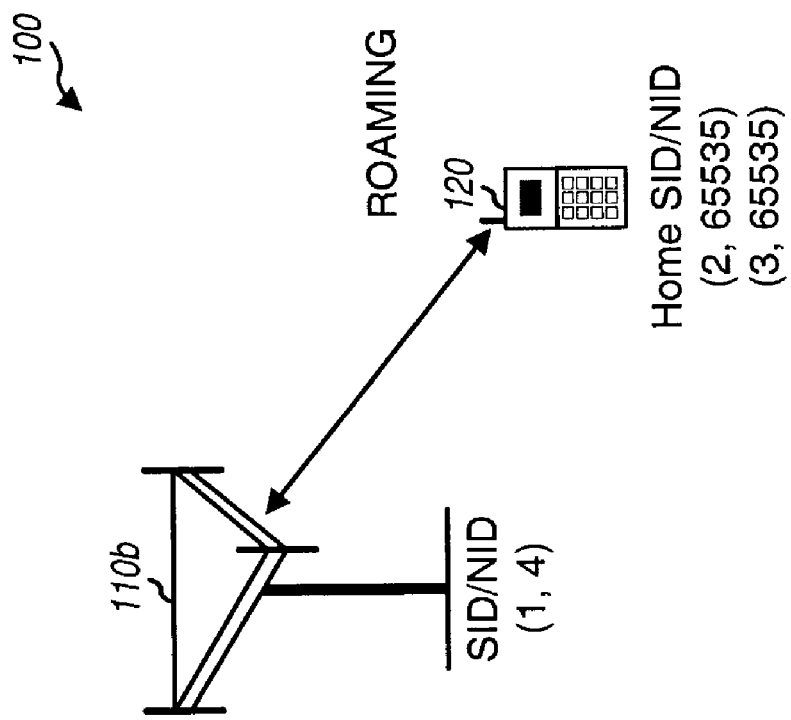
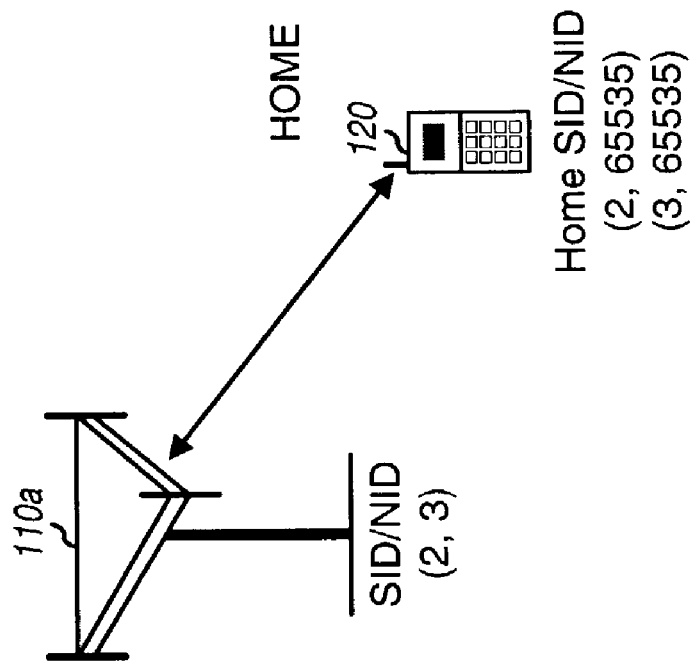
FIG. 1

Home SID/NID List

| SID | NID |
|-----|-------|
| 2 | 65535 |
| 3 | 65535 |

⇔

Home System Tag

"Welcome to the home system"

*FIG. 3A*

System Table

| | System (SID, NID) | Selection Preference | Roaming Indicator | Acquisition Index |
|---|---|---|---|---|
| Permitted Systems | 2, 65535 | first | 0x40 | 0 |
| | 3, 65535 | second | 0x41 | 1 |
| | 4, 65535 | second | 0x00 | 2 |
| | 5, 65535 | third | 0x01 | 4 |
| Forbidden Systems | 6, 65535 | - | - | 3 |
| | 7, 65535 | - | - | 3 |
| | 8, 65535 | - | - | 3 |

⇔

Group Tag List

| Roam_Ind | Tag | Roaming Display Indication |
|---|---|---|
| 0x40 | "CDMA Alliance A" | ON |
| 0x41 | "CDMA Alliance B" | OFF |
| 0x42 | "CDMA Alliance C" | Flashing |

*FIG. 3B*

System Table

| | System (SID, NID) | Selection Preference | Roaming Indicator | Acquisition Index |
|---|---|---|---|---|
| Permitted Systems | 2, 65535 | first | 0x40 | 0 |
| | 3, 65535 | second | 0x41 | 1 |
| | 4, 65535 | second | 0x00 | 2 |
| | 5, 65535 | third | 0x01 | 4 |
| Forbidden Systems | 6, 65535 | - | - | 3 |
| | 7, 65535 | - | - | 3 |
| | 8, 65535 | - | - | 3 |

⇔

Specific Tag List

| SID(s) | Tag | Roaming Display Indication |
|---|---|---|
| 100 | "Network Operator 123" | Flashing |
| 101-105 | "Network Operator XYZ" | OFF |
| 200 | "Network Operator A1" | ON |

*FIG. 3C*

DOWNLOAD AND DISPLAY OF SYSTEM TAGS IN WIRELESS COMMUNICATION SYSTEMS

BACKGROUND

1. Field

The present invention relates generally to communication, and more specifically to techniques for downloading and displaying system tags in wireless communication systems.

2. Background

Wireless communication systems are widely deployed to provide various communication services such as voice, packet data, and short messages. These systems may be multiple-access systems capable of supporting communication with multiple users by sharing the available system resources. Examples of such multiple-access systems include code division multiple access (CDMA) systems, time division multiple access (TDMA) systems, and frequency division multiple access (FDMA) systems. A CDMA system may be designed to implement one or more standards such as IS-2000, IS-95, W-CDMA, and so on. A TDMA system may be designed to implement one or more standards such as Global System for Mobile Communications (GSM).

A network operator/service provider may deploy one or more wireless communication systems to provide services for its subscribers. Each deployed system covers a particular geographic region (e.g., a city) and may in turn include one or more smaller networks. For CDMA, each system can be uniquely identified by a specific system identification (SID) code value, and each network may also be uniquely identified by a specific network identification (NID) code value. Each base station operated by the network operator would then transmit the SID and NID values of the specific system and network to which it belongs.

Wireless terminals operated by the subscribers are typically located throughout the coverage areas of the deployed systems. For CDMA, a terminal may include a preferred roaming list (PRL) that identifies the specific systems that the terminal can access and (optionally) the systems that the terminal cannot access. The terminal further maintains a list of one or more home systems, with each home system being identified by its unique (SID, NID) pair. The terminal can then determine whether or not it is in communication with a home system based on its home (SID, NID) pairs and the (SID, NID) pair received from a serving system. The serving system is the system from which the terminal obtains service. The terminal is deemed to be roaming if the (SID, NID) pair received from the serving system does not match any one of the home (SID, NID) pairs.

Conventionally, for CDMA, a wireless terminal has means to display a roaming indicator (which is typically an icon) and/or specific text strings based on its roaming status. For example, if the terminal is obtaining service from a home system, then it may display the name of the home service provider on a terminal screen. Conversely, if the terminal is obtaining service from a roaming system (i.e., a system that is not a home system), then it may indicate its roaming condition in accordance with a roaming indicator value associated with the roaming system. This roaming indicator value may be stored in a system record maintained for the roaming system and included in the preferred roaming list. Conventionally, the type of information that may be conveyed by the terminal for roaming is limited and specifically defined by TIA/EIA-683-B Annex C. For example, the roaming indicator value may direct the terminal to display the roaming indicator/icon and/or display a specific text string on the terminal screen.

CDMA systems have been widely deployed and international roaming has become more prevalent. Service providers may desire to provide different and/or more specific information to their subscribers based on roaming conditions. For example, a service provider may desire to provide the name of a roaming system to a terminal so that the system name can be displayed on the terminal screen for a subscriber.

There is therefore a need in the art for techniques to download and display information based on roaming status of the terminals.

SUMMARY

Techniques are provided herein for downloading system tags to terminals and for displaying these system tags based on the roaming status of the terminals. A tag is a set of alphanumeric characters and possibly graphics that may be displayed on a terminal screen. The system tags may be defined to include home system tags and roaming system tags, and the roaming system tags may further be defined to include group tags and specific tags. A home system tag is associated with one or more home systems, a group tag is associated with one or more roaming indicator values, and a specific tag is associated with one or more SID values.

A terminal is typically provided with one home system tag and may be provided with any number of group tags and specific tags. The home system tag is displayed whenever the terminal obtains service from a home system. A roaming system tag may be displayed whenever the terminal obtains service from a roaming system. The particular roaming system tag to be displayed is dependent on the roaming indicator value and the SID value for the roaming system from which service is obtained.

The system tags may be downloaded to the terminal via over-the-air signaling. A set of system tag messages is provided herein. These messages may be used to (1) request for the system tags currently stored by the terminal and/or the current configuration information for the system tags, and (2) download new system tags to the terminal.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 1 shows a wireless communication network;

FIG. 3A illustrates the association between a home SID/NID list and a home system tag;

FIGS. 3B and 3C illustrate the association between systems in a system table and group tags and specific tags, respectively;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

FIG. 1 shows a diagram of a wireless communication network 100. Network 100 includes multiple systems, and each system further includes one or more smaller networks. Each system may be uniquely identified by a SID value, and each smaller network may be uniquely identified by a NID value. Network 100 typically includes many base stations, but only two base stations for two systems are shown in FIG. 1 for simplicity. A base station 110a provides service for a system with a (SID, NID) pair of (2, 3), and a base station 110b provides service for a system with a (SID, NID) pair of (1, 4). The base stations are fixed stations used for communicating with wireless terminals, and may also be referred to as Node B, access point, or some other terminology.

A number of wireless terminals may be located throughout the coverage area of network 100. Each terminal includes a list of one or more (SID, NID) pairs for one or more systems that are designated as the home system for the terminal. For simplicity, only one terminal 120 is shown in FIG. 1, and this terminal has two home (SID, NID) pairs of (2, 65535) and (3, 65535). The NID value of 65535 may be used to indicate that only the SID (and not the NID) is used to determine whether or not a serving system is the home system. Thus, if the NID value is 65535, then all systems with the same SID value as that in the home (SID, NID) pair will be considered as non-roaming systems, regardless of the NID values of these systems.

In FIG. 1, terminal 120 obtains service from a home system when it communicates with base station 110a. This is because base station 110a belongs to a system with a SID value of 2, and the terminal considers all systems with SID value of 2 to be non-roaming (because the NID value in this home (SID, NID) pair is 65535). This same terminal 120 is deemed to be obtaining service from a roaming system when it communicates with base station 110b. This is because station 110b belongs to a system with a SID value of 4, which does not match any one of the SID values in the two home (SID, NID) pairs for the terminal.

For CDMA, each terminal is programmed with a preferred roaming list (PRL) that identifies the specific systems that the terminal can access and possibly the systems that the terminal cannot access. The preferred roaming list is not accessible by the user, but may be updated using specified procedure and messages. The preferred roaming list is stored in non-volatile memory within the terminal.

Figure 2:
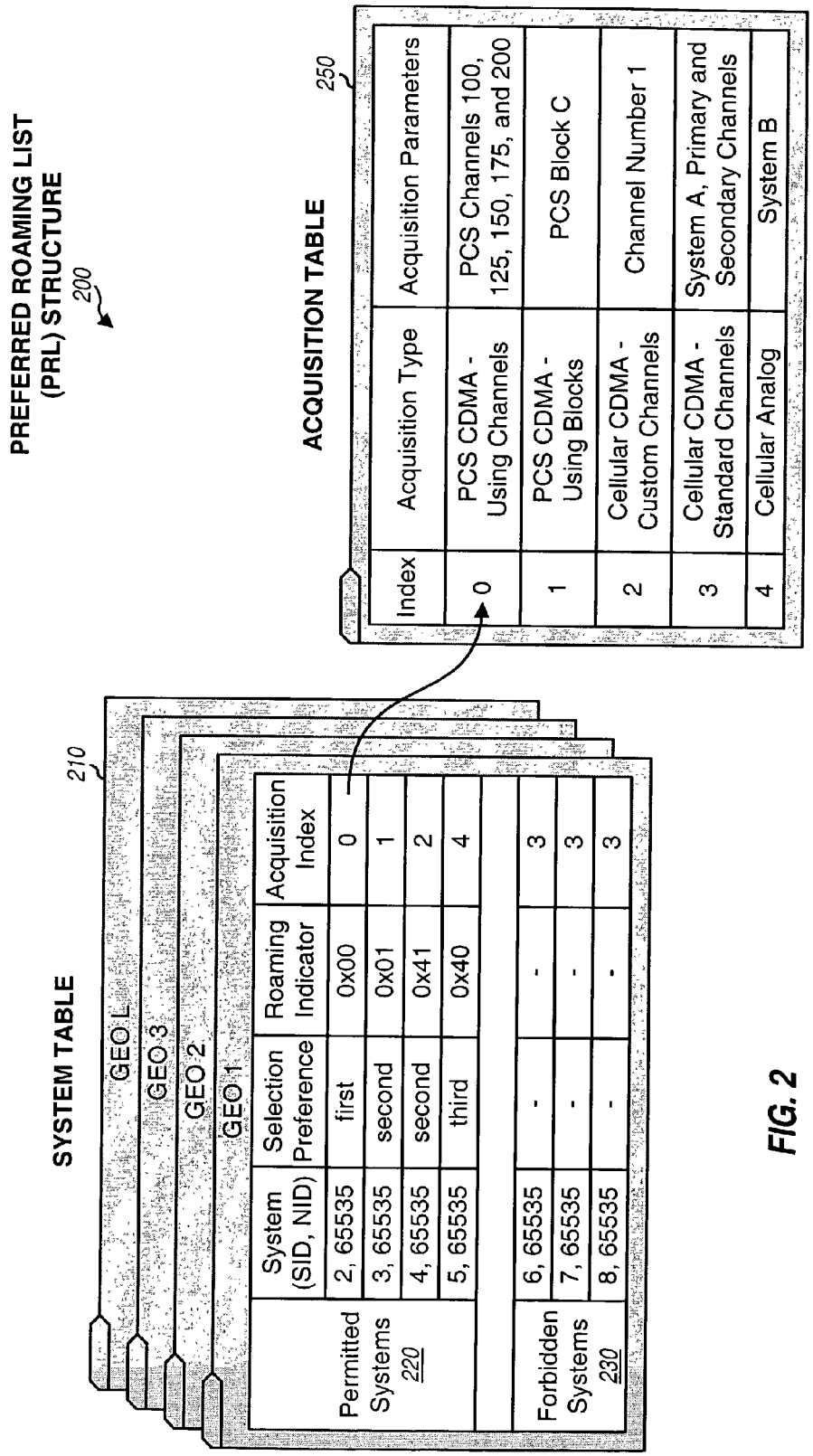
FIG. 2 shows a structure for the preferred roaming list (PRL)

FIG. 2 shows a structure 200 for the preferred roaming list. This PRL structure includes a system table 210 and an acquisition table 250. The system table includes a listing of accessible and inaccessible systems, which is organized by geographic areas (GEOs). As shown in FIG. 2, a table is provided for each geographic area, and this table includes a section 220 for accessible or permitted systems and a section 230 for inaccessible or forbidden systems. The accessible systems include home systems and other systems that the terminal is allowed to access.

The table for each geographic area may be defined to include one record (or row) for each system included in the table and multiple fields (or columns) for pertinent information for each system. These fields may include, for example, SID/NID, selection preference, roaming indicator, and acquisition index fields. For each record, the SID/NID field includes the unique (SID, NID) pair for the associated system. The selection preference field indicates the preference for the associated system among the permitted systems within the same geographic area, where the preference is typically specified by the network operator. The roaming indicator field includes a roaming indicator value for the associated system. The acquisition index field includes an index value that points to a specific record in the acquisition table containing the parameter values to use to acquire the associated system. The home systems are typically also included in the system table, but are also identified by a home SID/NID list that is typically stored separate from the system table.

The acquisition table includes one record (or row) for each unique index value and multiple fields (or columns) for various parameter values used for system acquisition. The preferred roaming list is described in further detail in TIA/EIA-683-B Annex C, which is publicly available and incorporated herein by reference.

In an aspect, system tags are provided herein for display on a terminal screen based on the roaming status of the terminal. A tag is a set of alphanumeric characters and possibly graphics (e.g., icons, pictures, and so on) that may be displayed on the terminal screen. In an embodiment, the system tags include home system tags and roaming system tags, which may be viewed as different types of system tags. In an embodiment, the roaming system tags further include group tags and specific tags, which may be viewed as different types of roaming system tags. Different and/or additional tag types may also be defined, and this is within the scope of the invention.

In an embodiment, one home system tag is provided for the terminal and is displayed whenever the terminal obtains service from a home system. However, multiple home system tags may also be provided for the terminal (e.g., one home system tag for each home (SID, NID) pair). In this case, the proper home system tag may be displayed depending on the particular home system from which the terminal is obtaining service. For simplicity, the following description assumes that only one home system tag is stored by the terminal.

A roaming system tag may be displayed whenever the terminal obtains service from a roaming system. Each group tag is associated with either a single roaming indicator value or a range of roaming indicator values. Each specific tag is associated with either a single SID value or a range of SID values. The particular roaming system tag to display on the terminal screen is dependent on the roaming indicator value and the SID value for the roaming system from which service is obtained.

The system tags may be stored in non-volatile memory within the terminal so that these tags are retained when power is turned off. The non-volatile memory may be a non-volatile RAM, a Flash memory, a Removable User Identity Module (R-UIM) defined by cdma2000, a Universal Subscriber Identity Module (USIM) defined by W-CDMA, and so on. In an embodiment, the system tags may be downloaded and updated via over-the-air messages, as described below.

FIG. 3A illustrates the association between the home SID/NID list and the home system tag. For this example, the home SID/NID list includes two (SID, NID) pairs of (2, 65535) and (3, 65535) for the terminal shown in FIG. 1. The home system tag includes a text string of "Welcome to the home system." This home system tag is displayed by the terminal whenever it receives service from any one of the systems included in the home SID/NID list, which for this example is any system with a SID value of 2 or 3.

FIG. 3B illustrates the association between the systems in the system table and a list of group tags. As shown in FIG. 2, the permitted systems in the system table are each associated with a specific roaming indicator value. Multiple permitted systems may be associated with the same roaming indicator value. A group tag may be defined for a single roaming indicator value or a range of roaming indicator values. Multiple group tags may be defined to cover all of the roaming indicator values for the permitted systems in the system table. Each group tag may be associated with one or multiple roaming indicator values, a tag of texts and/or graphics, and a roaming display indication that specifies how the roaming indicator/icon is to be displayed for the group tag.

For the example shown in FIG. 3B, the group tag list includes three group tags that are associated with three roaming indicator values of 0×40, 0×41, and 0×42, where 0× indicates a hexadecimal value. Whenever the terminal obtains service from a roaming system that has a roaming indicator value matching any one of these three roaming indicator values, the group tag associated with the matched value is displayed on the terminal screen. For example, if the terminal obtains service from a roaming system with a roaming indicator value of 0×042, then the tag "CDMA Alliance C" is displayed and a flashing roaming indicator/icon is also displayed. In general, the roaming indicator/icon is displayed in accordance with the roaming displaying indication (e.g., ON, OFF, or flashing) associated with the group tag being displayed.

FIG. 3C illustrates the association between the systems in the system table and a list of specific tags. As also shown in FIG. 2, the permitted systems in the system table are each associated with a specific SID value. A specific tag may be defined for a single SID value or a range of SID values. Each specific tag would then be associated with one or multiple SID values, a tag of texts and/or graphics, and a roaming display indication. For the example shown in FIG. 3C, the specific tag list includes three specific tags that are associated with a SID value of 100, a range of SID values from 101 to 105, and a SID value of 200. Whenever the terminal obtains service from a roaming system that has a SID value matching any one of the SID values covered by the specific tag list, the specific tag associated with the matched SID value is displayed on the terminal screen. For example, if the terminal obtains service from a roaming system with a SID value of 103, then the tag "Network Operator XYZ" is displayed. Again, the roaming indicator/icon is also displayed in accordance with the roaming displaying indication associated with the specific tag being displayed.

Figure 4:
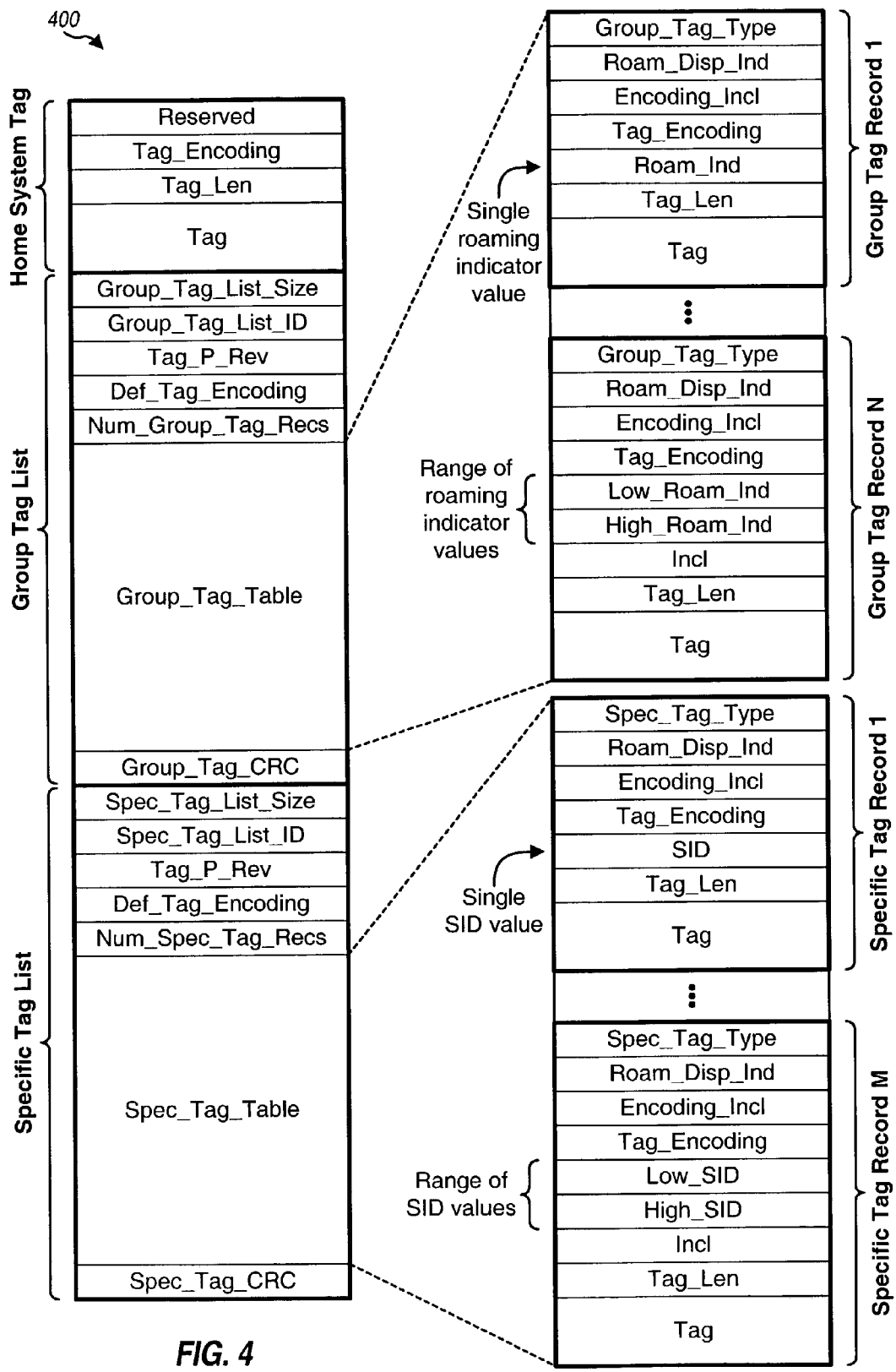
FIG. 4 shows a structure for storing system tags within the terminal.

FIG. 4 shows an embodiment of a structure 400 for storing the system tags within the terminal. In an embodiment, the home system tag, group tag list, and specific tag list are stored in three different sections of a non-volatile memory or in three separate storage areas within the terminal. The group tag list and specific tag list each includes (1) a set of fields for various parameters for the list and (2) a tag table that stores records for the tags in the list, one record per tag. Each group tag record and each specific tag record further includes various fields for the associated tag.

Table 1 lists the fields of the home system tag for an exemplary design.

TABLE 1

Home System Tag

| Field | Length (bits) | Description |
| --- | --- | --- |
| Reserved | 6 | Reserved |
| Tag_Encoding | 5 | The encoding type used for the home system tag. |
| Tag_Len | 5 | The length of the home system tag (in bytes). |
| Tag | 8 × Tag_Len | The texts and/or graphics for the home system tag. |

The Tag-Encoding field indicates the specific encoding type used for each character in the Tag field. The possible values for the Tag-Encoding field may be defined as shown in Table 9.1-1 in TSB-58-E, entitled "Administration of Parameter Value Assignments for cdma2000 Spread Spectrum Standards," which is publicly available and incorporated herein by reference.

Table 2 lists the fields of the group tag list for an exemplary design.

TABLE 2

Group Tag List

| Field | Length (bits) | Description |
| --- | --- | --- |
| Group_Tag_List_Size | 16 | The overall size (in bytes) of the group tag list. |
| Group_Tag_List_ID | 16 | The identifier for the group tag list. |
| Tag_P_Rev | 8 | The protocol revision for the system tags. |
| Def_Tag_Encoding | 5 | The default encoding type used for the group tags. |
| Num_Group_Tag_Recs | 8 | The number of group tags in the list. |
| Group_Tag_Table | variable | The records for the group tags. |
| Group_Tag_CRC | 16 | The CRC value for the group tag list. |

The first 5 fields in Table 2 represent a header for the group tag list. The Group$_{13}$Tag_List_ID includes an identifier for the group tag list. This identifier may be used to conveniently ascertain which group tag list is stored by the terminal, without having to read the individual tag records. The Def_Tag_Encoding field indicates the default encoding type to use for the Tag fields of the records included in the Group_Tag_Table, if none is specified by any of these records.

The group tag list may include any number of group tags, with the exact number being indicated by the Num_Group_Tag_Recs field. Each group tag is stored as one record in the Group_Tag_Table. The Group_Tag_CRC field includes a cyclic redundancy check (CRC) value that is computed based on all of the fields of the group tag list (except for the CRC field). This CRC value may be used to determine whether or not the group tag list is correct.

Table 3 lists the fields of an exemplary group tag record for a group tag associated with a single roaming indicator value.

TABLE 3

Group Tag Record for Single Roaming Indicator Value

| Field | Length (bits) | Description |
|---|---|---|
| Group_Tag_Type | 3 | Set to "000" for a group tag associated with a single roaming indicator value. |
| Roam_Disp_Ind | 4 | The roaming display indication to use with the tag: 0000 = ON, 0001 = OFF, 0010 = flashing. |
| Encoding_Incl | 1 | Indicates whether or not the Tag_Encoding field is included in the record. |
| Tag_Encoding | 0 or 5 | The encoding type used for the Tag field. |
| Roam_Ind | 8 | The roaming indicator value associated with the group tag. |
| Tag_Len | 5 | The length of the group tag (in bytes). |
| Tag | 8 × Tag_Len | The texts and/or graphics for the group tag. |

Conventionally, the roaming indicator/icon is displayed on the terminal screen in the manner specified by the roaming indicator value. The mapping between roaming indicator values and roaming display indication is defined by TSB-58-E as follows: 0x00=ON, 0x01=OFF, and 0x02=flashing. However, the roaming system tags may be associated with roaming indicator values that are in the range of 0x40 to 0x7F. This range is reserved for non-standard enhanced roaming indicator (as indicated by Table 8.1-1 in TSB-58-E), and the roaming display indication is not defined for the roaming indicator/icon for these roaming indicator values. Thus, the Roam_Disp_Ind field is used to indicate the display option for the roaming indicator/icon for each roaming system tag. The possible values for the Roam_Disp_Ind field may be defined as shown in Table 3.

If the group tag record includes the Tag_Encoding field, then the encoding type included in this field is used for the Tag field in the record. Otherwise, the encoding type included in the Def_Tag_Encoding field of the group tag list (as shown in Table 2) is used.

Table 4 lists the fields of an exemplary group tag record for a group tag associated with a range of roaming indicator values.

The group tag in Table 4 is associated with a range of roaming indicator values. The two ends of the range are defined by the values in the Low_Roam_Ind and High_Roam_Ind fields. The Incl field includes an increment value used for the roaming indicator values in the range. The group tag may be defined such that it is associated with only a subset of the values within the range, and this is achieved by setting the Incl field with a value that is greater than one. For example, to cover only odd roaming indicator values, the Low_Roam_Ind and High_Roam_Ind fields may be set to odd values and the Incl field may be set to 2.

Table 5 lists the fields of the specific tag list for an exemplary design.

TABLE 5

Specific Tag List

| Field | Length (bits) | Description |
|---|---|---|
| Spec_Tag_List_Size | 16 | The overall size (in bytes) of the specific tag list. |
| Spec_Tag_List_ID | 16 | The identifier for the specific tag list. |
| Tag_P_Rev | 8 | The protocol revision for the system tags. |

TABLE 4

Group Tag Record for a Range of Roaming Indicator Values

| Field | Length (bits) | Description |
|---|---|---|
| Group_Tag_Type | 3 | Set to "001" for a group tag associated with a range of roaming indicator values. |
| Roam_Disp_Ind | 4 | The roaming display indication to use with the tag. |
| Encoding_Incl | 1 | Indicates whether or not the Tag_Encoding field is included in the record. |
| Tag_Encoding | 0 or 5 | The encoding type used for the Tag field. |
| Low_Roam_Ind | 8 | The roaming indicator value for the low end of the range associated with the group tag. |
| High_Roam_Ind | 8 | The roaming indicator value for the high end of the range associated with the group tag. |
| Incl | 3 | The increment value for the roaming indicator values within the range. |
| Tag_Len | 5 | The length of the group tag (in bytes). |
| Tag | 8 × Tag_Len | The texts and/or graphics for the group tag. |

TABLE 5-continued

Specific Tag List

| Field | Length (bits) | Description |
|---|---|---|
| Def_Tag_Encoding | 5 | The default encoding type used for the specific tags. |
| Num_Spec_Tag_Recs | 8 | The number of specific tags in the list. |
| Spec_Tag_Table | variable | The records for the specific tags. |
| Spec_Tag_CRC | 16 | The CRC value for the specific tag list. |

The first 5 fields in Table 5 represent a header for the specific tag list. The specific tag list may include any number of specific tags, with the exact number being indicated by the Num_Spec_Tag_Recs field. Each specific tag is stored as one record in the Spec_Tag_Table. The Spec_Tag_CRC field includes a CRC value that is computed based on all of the fields of the specific tag list (except for the CRC field). This CRC value may be used to determine whether or not the specific tag list is correct.

Table 6 lists the fields of an exemplary specific tag record for a specific tag associated with a single SID value.

TABLE 6

Specific Tag Record for Single SID Value

| Field | Length (bits) | Description |
|---|---|---|
| Spec_Tag_Type | 3 | Set to "000" for a specific tag associated with a single SID value. |
| Roam_Disp_Ind | 4 | The roaming display indication to use with the tag. |
| Encoding_Incl | 1 | Indicates whether or not the Tag_Encoding field is included in the record. |
| Tag_Encoding | 0 or 5 | The encoding type used for the Tag field. |
| SID | 15 | The SID value associated with the specific tag. |
| Tag_Len | 5 | The length of the specific tag (in bytes). |
| Tag | 8 × Tag_Len | The texts and/or graphics for the specific tag. |

Table 7 lists the fields of an exemplary specific tag record for a specific tag associated with a range of SID values.

TABLE 7

Specific Tag Record for a Range of SID Values

| Field | Length (bits) | Description |
|---|---|---|
| Spec_Tag_Type | 3 | Set to "001" for a specific tag associated with a range of SID values. |
| Roam_Disp_Ind | 4 | The roaming display indication to use with the tag. |
| Encoding_Incl | 1 | Indicates whether or not the Tag_Encoding field is included in the record. |
| Tag_Encoding | 0 or 5 | The encoding type used for the Tag field. |
| Low_SID | 15 | The SID value for the low end of the range associated with the specific tag. |
| High_SID | 15 | The SID value for the high end of the range associated with the specific tag. |
| Incl | 8 | The increment value for the SID values within the range. |
| Tag_Len | 5 | The length of the specific tag (in bytes). |
| Tag | 8 × Tag_Len | The texts and/or graphics for the specific tag. |

Tables 1 through 7 show exemplary formats for the home system tag, group tag list, group tag records, specific tag list, and specific tag records. Other formats may also be defined for each of these items, and this is within the scope of the invention. For example, the home system tag may be defined to include a CRC field.

Figure 5:
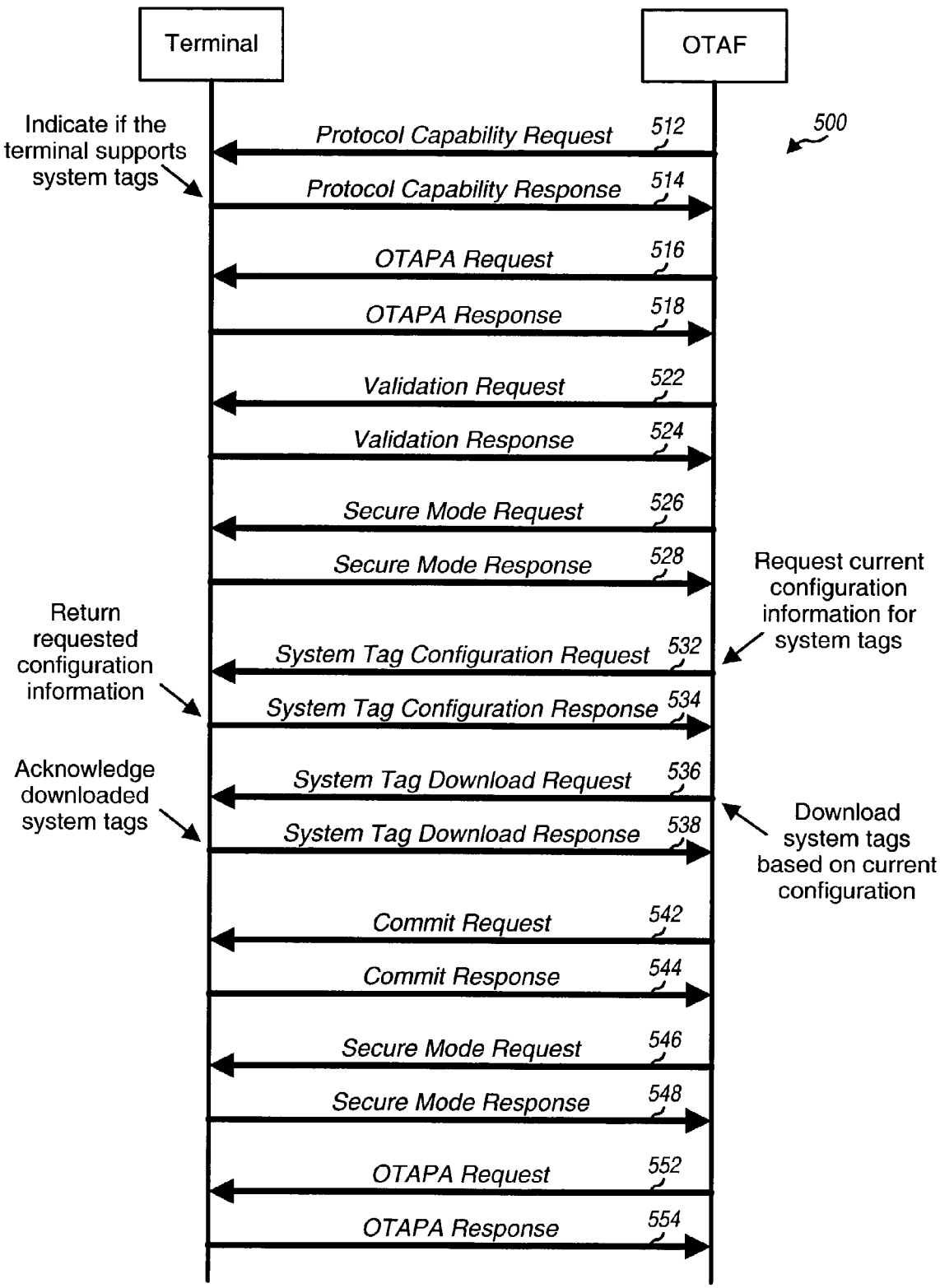
FIG. 5 shows a signal flow for over-the-air downloading of system tags to the terminal.

FIG. 5 shows an exemplary signal flow 500 for downloading system tags to the terminal using over-the-air signaling. Initially, the terminal receives a Protocol Capability Request message from an Over-the-Air Service Provisioning Function (OTAF) to request the capabilities of the terminal (step 512). The OTAF is a function on the network side responsible for parameter administration and service provisioning. The terminal responds with a Protocol Capability Response message that indicates whether or not the terminal has system tag capability (step 514). System tag downloading is only performed if the terminal supports system tags.

An OTAPA Request message and an OTAPA Response message are then exchanged between the terminal and the OTAF to initiate parameter administration, which in this case is for system tag downloading (steps 516 and 518). A Validation Request message and a Validation Response message are next exchanged to determine whether or not parameter administration can be performed for the user terminal (steps 522 and 524). If the answer is yes, then a Secure Mode Request message and a Secure Mode Response message are exchanged to enable application-level encryption (steps 526 and 528). This places subsequent communication in a secure mode for the system tag download.

The terminal next receives a System Tag Configuration Request message requesting current configuration information regarding the system tags stored by the terminal (step 532). The terminal then responses with a System Tag Configuration Response message with the current tag configuration information (step 534). The terminal then receives a System Tag Download Request message to download system tags, where the tags to be downloaded may be dependent on the current tag configuration (step 536). The terminal then responses with a System Tag Download Response message that acknowledges and further indicates the results of the tag downloading operation (step 538).

A Commit Request message and a Commit Response message are then exchanged to initiate the storage of the downloaded system tags into non-volatile memory within the terminal (steps 542 and 544). A Secure Mode Request message and a Secure Mode Response message are next exchanged to end the secure communication between the terminal and the OTAF (steps 546 and 548). An OTAPA Request message and an OTAPA Response message are finally exchanged to end the system tag downloading operation (steps 552 and 554).

FIG. 5 shows an exemplary signal flow for downloading system tags. Other signal flows may also be defined and used, and this is within the scope of the invention. The four system tag messages used in steps 532 though 538 are described in further detail below. The remaining messages in FIG. 5 are described in detail in TIA/EIA-683-B.

The System Tag Configuration Request message is sent to the terminal to request (step 532) current configuration information regarding the system tags stored by the terminal. Table 8 lists the fields of the System Tag Configuration Request message for an exemplary design.

TABLE 8

System Tag Configuration Request Message

| Field | Length (bits) | Description |
| --- | --- | --- |
| OTASP_Msg_Type | 8 | Set to 0xXX for the System Tag Configuration Request message. |
| Block_ID | 8 | Set as defined in Table 12 below. |
| The following two fields are includes if the Block_ID = 0x02 (group tag list) or 0x04 (specific tag list): | | |
| Request_Offset | 16 | The offset from the start of the tag list for the data block of system tag information being requested. |
| Request_Max_Size | 8 | The size of the data block being requested. |

The data block is described in further detail below. For Tables 8 through 11, 0xXX denotes any value that is available for assignment to the new system tag message.

The System Tag Configuration Response message is sent by the terminal to return the requested configuration information to the OTAF (step 534). Table 9 lists the fields of the System Tag Configuration Response message for an exemplary design.

TABLE 9

System Tag Configuration Response Message

| Field | Length (bits) | Description |
| --- | --- | --- |
| OTASP_Msg_Type | 8 | Set to 0xXX for the System Tag Configuration Response message. |
| Block_ID | 8 | Set to the Block_ID value in the System Tag Configuration Request message. |
| Result_Code | 8 | The results of the request operation. Set as defined in TIA/EIA-683-B. |
| Block_Len | 8 | The length of the Param_Data field (in bytes). |
| Param_Data | 8 × Block_Len | The requested data block of system tag information. |
| Fresh_Incl | 1 | Indicates whether or not the Fresh field is included in the message. |
| Fresh | 0 or 15 | A random number used for encryption. |
| Reserved | 0 or 7 | Reserved. |

The System Tag Download Request message is sent to the terminal to download system tags to the terminal (step 536). Table 10 lists the fields of the System Tag Download Request message for an exemplary design.

TABLE 10

System Tag Download Request Message

| Field | Length (bits) | Description |
| --- | --- | --- |
| OTASP_Msg_Type | 8 | Set to 0xXX for the System Tag Download Request message. |
| Block_ID | 8 | Set as defined in Table 12 below. |
| Block_Len | 8 | The length of the Param_Data field (in bytes). |

TABLE 10-continued

System Tag Download Request Message

| Field | Length (bits) | Description |
| --- | --- | --- |
| Param_Data | 8 × Block_Len | The data block of system tag information to be downloaded. |
| Fresh_Incl | 1 | Indicates whether or not the Fresh field is included in the message. |
| Fresh | 0 or 15 | A random number used for encryption. |
| Reserved | 0 or 7 | Reserved. |

The System Tag Download Response message is sent by the terminal to acknowledge the downloaded system tags (step 538). Table 11 lists the fields of the System Tag Download Response message for an exemplary design.

TABLE 11

System Tag Download Response Message

| Field | Length (bits) | Description |
| --- | --- | --- |
| OTASP_Msg_Type | 8 | Set to 0xXX for the System Tag Download Response message. |
| Block_ID | 8 | Set to the Block_ID value in the System Tag Download Request message. |
| Result_Code | 8 | The results of the download operation. Set as defined in TIA/EIA-683-B. |
| The following two fields are includes if the Block_ID = 0x01 (group tag list) or 0x02 (specific tag list): | | |
| Segment_Offset | 16 | The offset from the start of the tag list for the segment of system tag information just downloaded. |
| Segment_Size | 8 | The size of the segment just downloaded. |

For the four system tag messages described above, the Block_ID field indicates the type of data block being requested by or sent in the message. Table 12 lists the different types of data block.

TABLE 12

Data Block Types

| System Tag Configuration Request/Response Messages | | System Tag Download Request/Response Messages | |
| --- | --- | --- | --- |
| Data Block Type | Block_ID | Data Block Type | Block_ID |
| Home System Tag | 0x00 | Home System Tag | 0x00 |
| Group Tag List Dimension | 0x01 | Group Tag List | 0x01 |
| Group Tag List | 0x02 | Specific Tag List | 0x02 |
| Specific Tag List Dimension | 0x03 | | |
| Specific Tag List | 0x04 | | |

The terminal may be requested by the System Tag Configuration Request message to send back a data block for the home system tag, the group tag list, the dimension of the group tag list, the specific tag list, or the dimension of the specific tag list. A dimension data block includes only certain information regarding a tag list and does not include any of the records for the tag list. The terminal may be downloaded with a data block for the home system tag, the group tag list, or the specific tag list by the System Tag Download Request message. In one embodiment that is described below, the entire group tag list or specific tag list is downloaded to the terminal, if at all. In another embodiment, the group tags and specific tags may be individually downloaded to the terminal.

An exemplary data block for the home system tag (Block_ID=0x00) may be defined as shown in Table 1. This data block has a maximum size of 264 bits.

An exemplary data block for the group tag list dimension may be defined as shown in Table 13. This data block is used if Block_ID=0x01 for the system tag configuration messages.

TABLE 13

Data Block for Group Tag List Dimension

| Field | Length (bits) | Description |
| --- | --- | --- |
| Max_Group_Tag_List_Size | 16 | The maximum size for the group tag list. |
| Curr_Group_Tag_List_Size | 16 | The size of the current group tag list. |
| Group_Tag_List_ID | 16 | The identifier for the group tag list. |
| Tag_P_Rev | 8 | The protocol revision for the system tags. |
| Num_Group_Tag_Recs | 8 | The number of group tags in the list. |

An exemplary data block for the specific tag list dimension may be defined as shown in Table 14. This data block is used if Block_ID=0x03 for the system tag configuration messages.

TABLE 14

Data Block for Specific Tag List Dimension

| Field | Length (bits) | Description |
| --- | --- | --- |
| Max_Spec_Tag_List_Size | 16 | The maximum size for the specific tag list. |
| Curr_Spec_Tag_List_Size | 16 | The size of the current specific tag list. |
| Spec_Tag_List_ID | 16 | The identifier for the specific tag list. |
| Tag_P_Rev | 8 | The protocol revision for the system tags. |
| Num_Spec_Tag_Recs | 14 | The number of specific tags in the list. |
| Reserved | 2 | Reserved. |

An exemplary data block for the group tag list and the specific tag list may be defined as shown in Table 15. This data block is used if Block_ID=0x02 or 0x04 for the system tag configuration messages and if Block_ID=0x01 or 0x02 for the system tag download messages.

TABLE 15

Data Block for Group Tag List and Specific Tag List

| Field | Length (bits) | Description |
| --- | --- | --- |
| Tag_P_Rev | 8 | The protocol revision for the system tags. |
| Reserved | 7 | Reserved |
| Last_Segment | 1 | Indicates whether or not the segment being sent is the last one for the tag list. |
| Segment_Offset | 16 | The offset from the start of the tag list for the segment being sent. |
| Segment_Size | 8 | The size of the segment being sent (in bytes). |
| Segment_Data | 8 × Segment_Size | Data for the segment being sent. |

The four system tag messages described above may each be encapsulated within a signaling message (e.g., a Data Burst Message at Layer 3 in IS-95 and IS-2000) prior to transmission over the air. The Data Burst Message is capable of carrying up to 255 bytes of data, and the size of the four system tag messages would need to be limited accordingly. The group tag list and specific tag list may each be larger than the capacity of one Data Burst Message. In that case, the entire group tag list or specific tag list may be partitioned into multiple segments and sent via multiple instances of the Data Burst Message, one segment per message. The Segment_Size field indicates the size of the current segment being sent. The Segment_Offset field indicates the offset from the start of the tag list for the current segment. The Last_Segment field indicates whether or not the current segment is the last segment for the tag list. Even though the downloading may be achieved via multiple System Tag Download Request messages and multiple instances of the Data Burst Message, the entire downloading operation may be viewed as being performed by one message transaction.

Figure 6A:
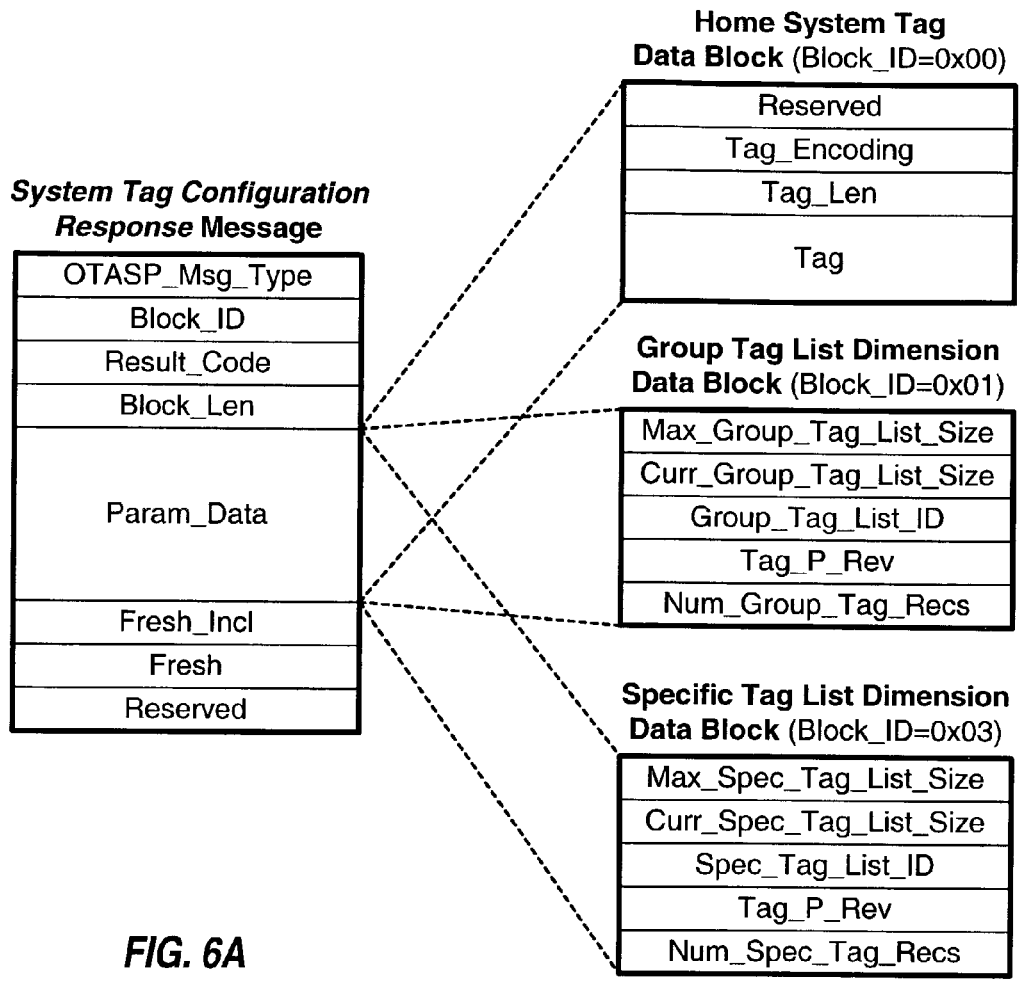
FIGS. 6A and 6B show the format of a System Tag Configuration Response message sent by the terminal for different data block types.

FIG. 6A shows the format of the System Tag Configuration Response message sent by the terminal for three different data block types. The Param_Data field of this message includes (1) the data block for the home system tag shown in Table 1 if Block_ID=0×00, (2) the data block for the group tag list dimension shown in Table 13 if Block_ID=0×01, or (3) the data block for the specific tag list dimension shown in Table 14 if Block_ID=0×03.

Figure 6C:
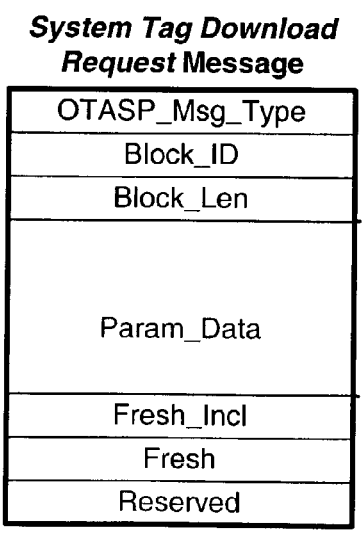
FIGS. 6C and 6D show the format of a System Tag Download Request message sent to the terminal to download a home system tag and a group tag list/specific tag list, respectively.
Figure 6B:
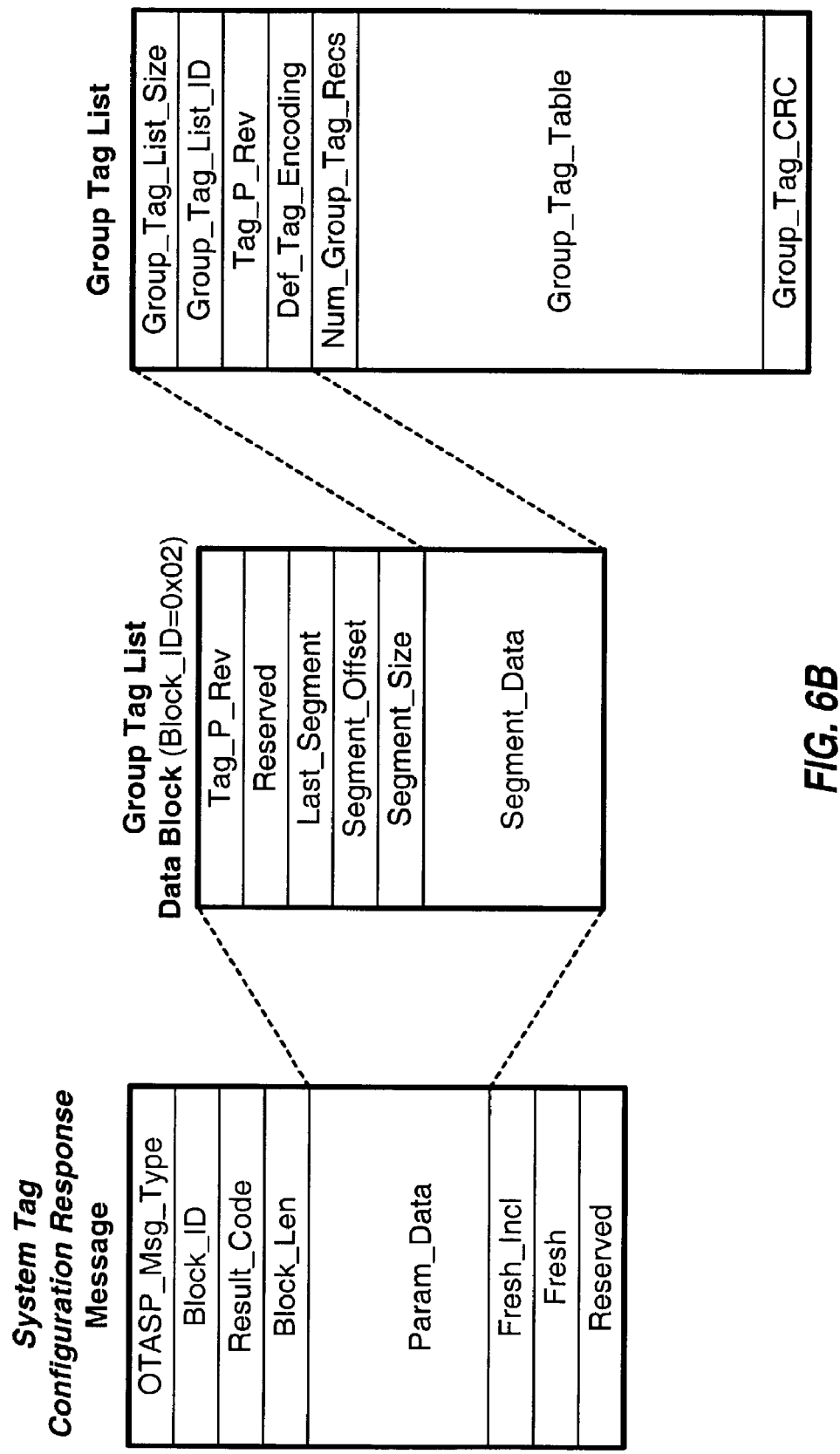

FIG. 6B shows the format of the System Tag Configuration Response message sent by the terminal for two different data block types. The Param_Data field of this message includes (1) a data block for the group tag list shown in Table 15 if Block_ID=0×02, or (2) a data block for the specific tag list as also shown in Table 15 if Block_ID=0×04. In FIG. 6B, a data block for the group tag list is being sent. As also shown in FIG. 6B, only a portion of the group tag list is being sent in the current data block, with this portion being identified by the Segment_Offset and Segment_Size fields of the data block.

FIG. 6C shows the format of the System Tag Download Request message sent to the terminal to download a new home system tag (Block_ID=0×00). The Param_Data field of this message includes the data block for the home system tag shown in Table 1 and in FIG. 6A.

Figure 6D:
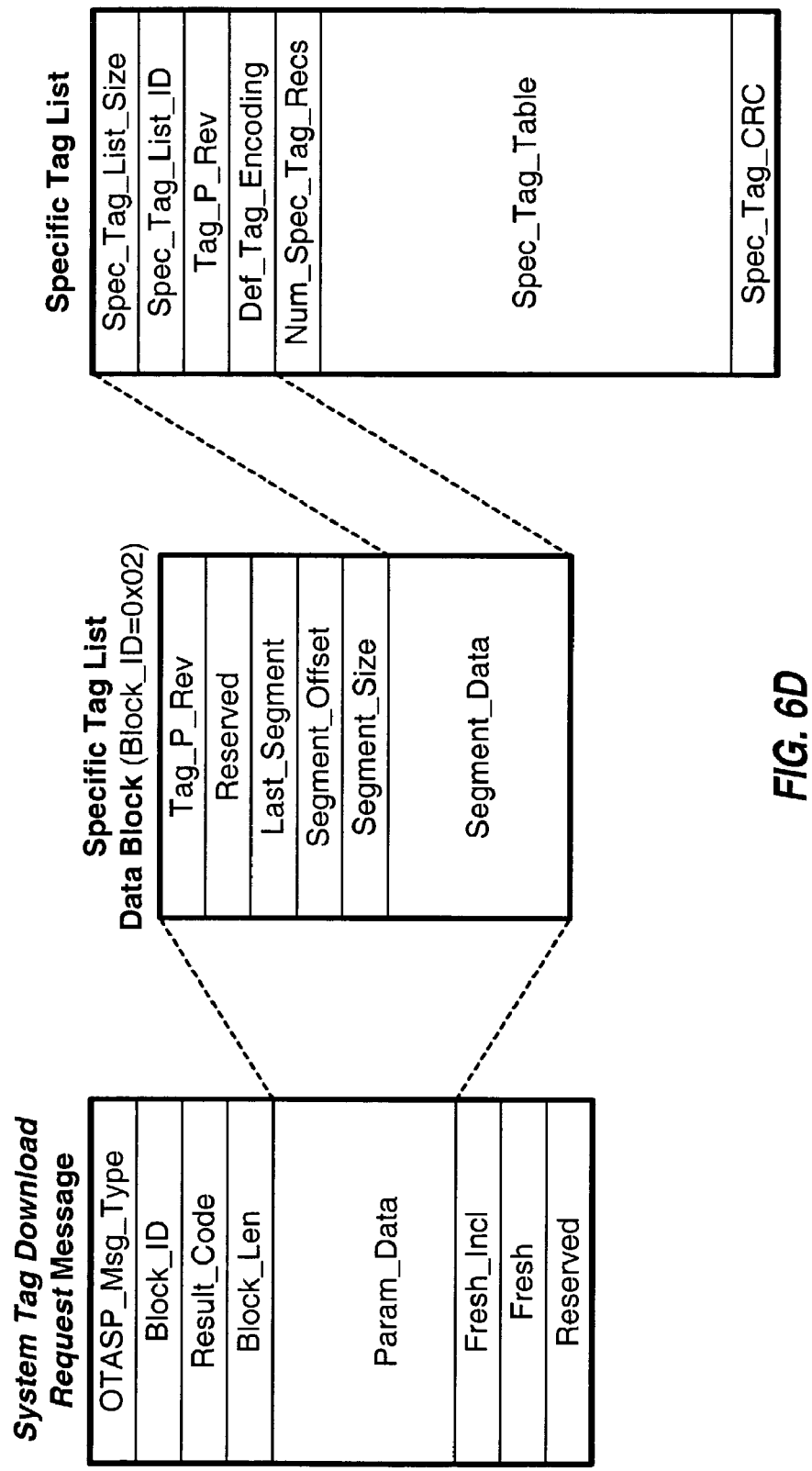

FIG. 6D shows the format of the System Tag Download Request message sent to the terminal to download a specific tag list (Block_ID=0×02). The Param_Data field of this message includes a data block for the specific tag list, which is shown in Table 15. As shown in FIG. 6D, only a portion of the specific tag list is being sent in the current data block, with this portion being identified by the Segment_Offset and Segment_Size fields of the data block. The group tag list may also be downloaded to the terminal in similar manner.

Figure 7:
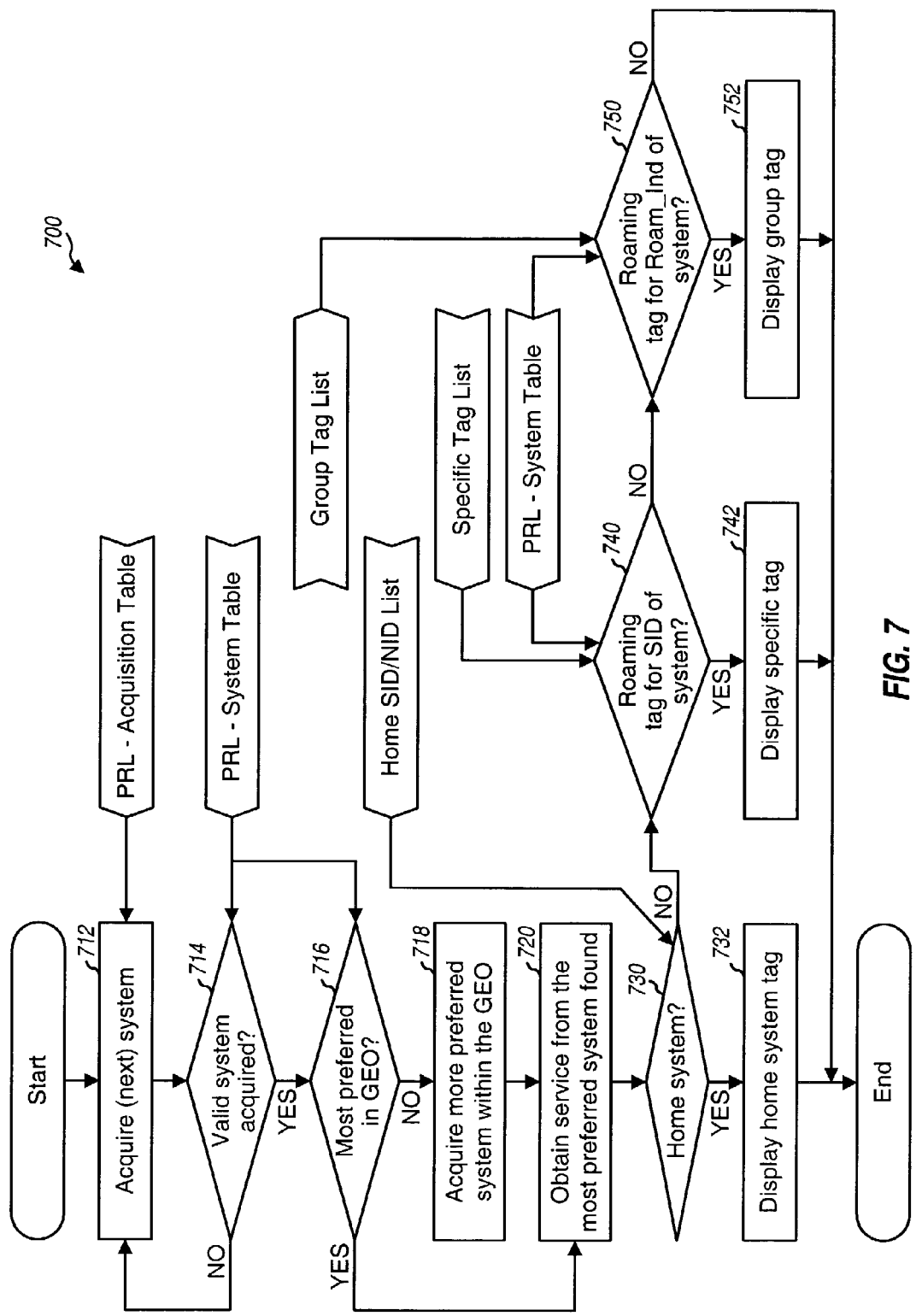
FIG. 7 shows a flow diagram of a process for displaying the proper system tag based on the roaming status of the terminal.

FIG. 7 shows a flow diagram of an embodiment of a process 700 for displaying the proper system tag based on the roaming status of the terminal. Initially, the terminal attempts to acquire a system (step 712). The system acquisition is typically performed in accordance with the acquisition table in the preferred roaming list. For example, the parameter values associated with the highest priority index (e.g., index 0 in the acquisition table in FIG. 2) may be used first for acquisition, the parameter values associated with the next highest priority index (e.g., index 1) may be used next if acquisition with index 0 was unsuccessful, and so on.

If a system is acquired, then the geographic area to which this system belongs is identified. A determination is next made whether or not the acquired system is valid (step 714). The system table may be used to make this determination. In particular, the acquired system is deemed to be valid if it is one of the permitted systems in the identified geographic area. If the acquired system is not valid, then the process returns to step 712 to acquire another system within the same geographic area using the system table and acquisition table.

If the acquired system is deemed to be valid in step 714, then a determination is next made whether or not the acquired system is the most preferred one for the identified geographic area (step 716). The selection preference in the system table may be used to make this determination. If the answer is no, then the terminal attempts to acquire a more preferred system within the same geographic area (step 718). In either case, service is obtained from the most preferred system found by the terminal (step 720). This system is also referred to as the serving system.

A determination is then made whether or not the serving system is a home system for the terminal (step 730). This determination may be made based on the home SID/NID list for the terminal and the (SID, NID) pair for the serving system. If the serving system is a home system, then the home system tag is displayed (step 732) and the process then terminates.

Otherwise, if the serving system is not a home system (step 730) a determination is made whether or not the SID of the serving system is one of the SID values covered by the specific tag list (step 740). This determination may be made based on the system record for the serving system and the specific tag list for the terminal. If the answer to step 740 is yes, then the specific tag associated with the SID value for the serving system is displayed (step 742) and the process then terminates.

Otherwise, a determination is made whether or not the roaming indicator value for the serving system is one of the roaming indicator values covered by the group tag list (step 750). This determination may be made based on the system record for the serving system and the group tag list for the terminal. If the answer to step 750 is yes, then the group tag associated with the roaming indicator value for the serving system is displayed (step 752) and the process then terminates.

Figure 8:
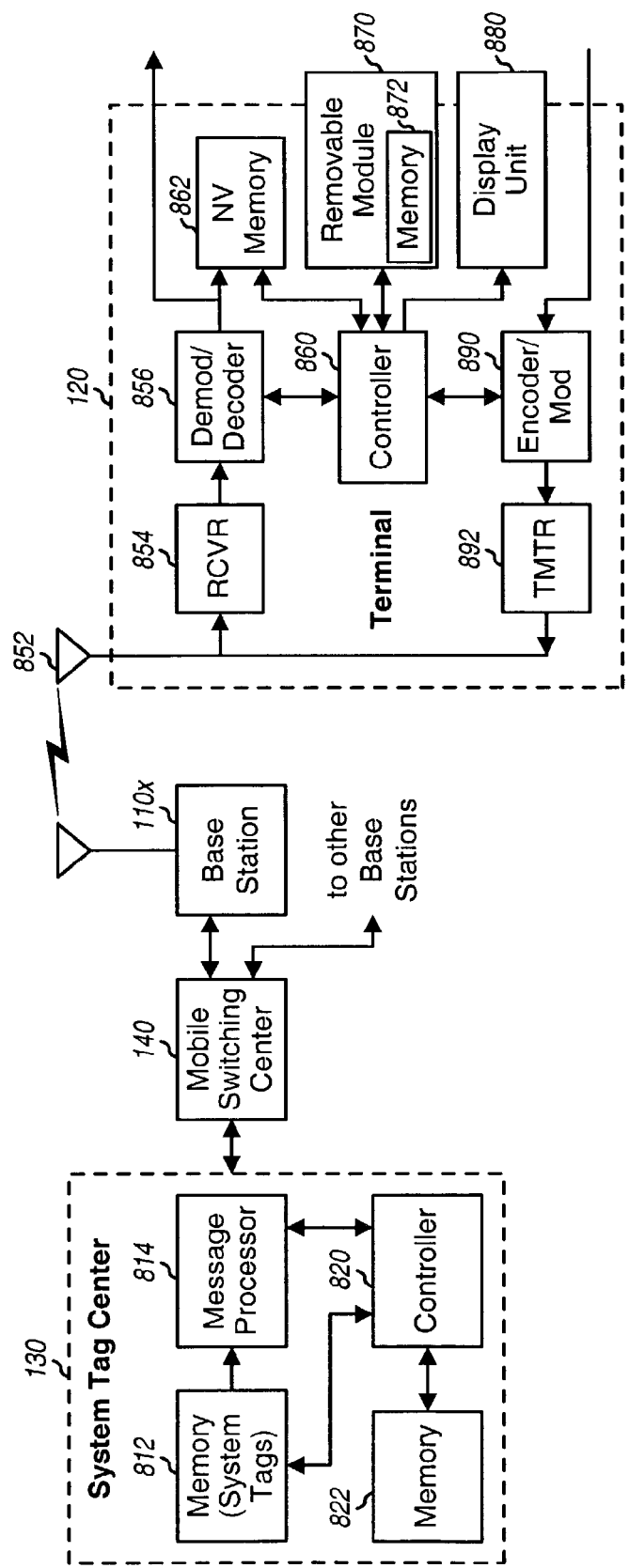
FIG. 8 shows a block diagram of a system tag center and the terminal.

FIG. 8 shows a block diagram of an embodiment of a system tag center 130 and terminal 120 that support system tags. System tag center 130 may be implemented by any one of various network entities. For example, system tag center 130 may be implemented by a network entity that supports OTAF.

System tag center 130 supports system tags on the network side. Within system tag center 130, a controller 820 directs the downloading of system tags to the terminals. This entails sending System Tag Configuration Request and System Tag Download Request messages to the terminals and receiving System Tag Configuration Response and System Tag Download Response messages from the terminals, as shown in FIG. 5, steps 532, 536, 534, 538, respectively. Controller 820 directs the generation and processing of these system tag messages. A memory unit 822 provides storage for program codes and data used by controller 820, and a memory unit 812 provides storage for the system tags (i.e., home system tags, group tags, and specific tags).

To download system tags, the one or more system tags to be downloaded are retrieved from memory unit 812 and provided to a message processor 814, which encapsulates these system tags in suitable system tag messages. The system tag messages may further be encapsulated in signaling messages (e.g., Data Burst Message). The signaling messages are then provided to a mobile switching center 140, which further forwards these messages to one or more base stations within its control. Each base station processes the received signaling messages and includes them in a forward link modulated signal that is transmitted to the terminals within its coverage area.

At terminal 120, the modulated signal transmitted from base station 110x is received by an antenna 852 and provided to a receiver unit (RCVR) 854. Receiver unit 854 conditions (e.g., filters, amplifies, and frequency downconverts) the received signal and further digitizes the conditioned signal to provide samples. A demodulator (Demod)/decoder 856 then demodulates the samples (e.g., based on cdma2000 physical layer processing) and further decodes the demodulated data to provide decoded data, which includes the signaling messages sent in the modulated signal. These signaling messages may further be processed by decoder 856 and/or a controller 860 to recover the system tag messages sent by system tag center 130. The pertinent data (e.g., downloaded system tags) in the recovered system tag messages may be extracted and provided to a non-volatile (NV) memory unit 862 and/or a memory unit 872 within a removable module 870. Removable module 870 may be an R-UIM (for cdma2000), USIM, or SIM (for W-CDMA and GSM).

On the reverse link, data, system tag messages (containing system tag information, configuration information, acknowledgment, and so on), and signaling messages to be sent by the terminal are provided to an encoder/modulator (Mod) 890, which encapsulates, encodes, and modulates the data/messages. The modulated data is then conditioned by a transmitter unit (TMTR) 892 to provide a reverse link modulated signal suitable for transmission back to the base station. The base station receives and processes the modulated signal to recover the system tag messages sent by the terminal, and forward these messages to system tag center 130. System tag center 130 receives and processes these system tag messages as part of the system tag downloading operation.

Controller 860 directs the operation of the units within terminal 120. For example, controller 860 may direct the downloading of system tags carried in the system tag messages and may direct the storage of the downloaded system tags to NV memory unit 862 and/or removable module 870. Controller 860 may further direct the retrieval of the proper system tag from memory unit 862 and/or removable module 870 based on the roaming status of the terminal. The retrieved system tag is then provided to a display unit 880 for presentation on a screen. Memory unit 862 also provides storage for program codes and data used by controller 860.

FIG. 8 shows a specific embodiment of system tag center 130 and terminal 120. Other designs may also be contemplated and are within the scope of the invention.

For clarity, specific designs have been described above for various aspects of the system tags. In particular, specific designs have been described for the system tags (home system tag, group tags, and specific tags), tag formats, system tag messages, and message formats. Various modifications may be made to these specific designs and various alternative designs may be used, and this is within the scope of the invention. For example, different types of tags may be formed, different tag formats may be used, different system tag messages and different message formats may be implemented, and so on.

Also for clarity, the system tags have been described with reference to cdma2000. In general, the system tags described herein may be used for various wireless communication systems such as CDMA systems (e.g., cdma2000, IS-95, and W-CDMA systems), TDMA systems (e.g., GSM systems), and so on.

The techniques described herein for downloading and displaying system tags may be implemented by various means. For example, these techniques may be implemented in hardware, software, or a combination thereof. For a hardware implementation, the elements used to implement any one or a combination of the techniques by the terminal or the network may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the download and display of system tags may be implemented by the terminal and the network with modules (e.g., procedures, functions, and so on) that perform the functions described herein. The software codes may be stored in a memory unit (e.g., memory units 822 and/or 862 in FIG. 8) and executed by a processor (e.g., controller 820 and/or 860). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of displaying system tags by a wireless terminal, comprising:
   determining if a serving system for the terminal is one of at least one home systems for the terminal;
   it the serving system is one of the at least one home systems:
      displaying a home system; and
   if the serving system in not one of the at least one home systems:

determining availability of a roaming system tag for the serving system by including ascertaining a system identification (SID) and a roaming indicator value for the serving system, and further by including ascertaining whether the SID value for the serving system is included in a set of SID values for which roaming system tags are available; and displaying the roaming system tag associated with the SID value of the serving system if available;

wherein the determining further including ascertaining a roaming indicator value for the serving system, and further including ascertaining whether the roaming indicator value for the serving system is included in a set of roaming indicator values for which roaming system tags are available, and wherein the roaming system tag associated with the roaming indicator value for the serving system is displayed if available and if the roaming system tag associated with the SID value for the serving system is not available.

2. A method of downloading system tag information in a wireless communication system, comprising:

receiving a first message requesting current configuration information for system tags stored by a terminal, wherein the system tags are suitable for display based on roaming status of the terminal, and wherein the system tags stored by the terminal include at least one home system tag and at least one roaming system tag, and wherein each of the system tags is associated with one or more systems, the at least one roaming system tag includes at least one group tag and at least one specific tag, wherein each of the at least one group tag is associated with one or more roaming indicator values, and wherein each of the at least one specific tag is associated with one or more system identification (SID) values;

sending a second message with the requested current configuration information; and receiving a third message for at least one system tag to be downloaded to the terminal.

3. The method of claim 2, wherein the at least one group tag is included in a first list and the at least one specific tag is included in a second list.

4. The method of claim 3, wherein an entire list of one or more group tag is downloaded to the terminal if selected, and wherein an entire list of one or more specific tags is downloaded to the terminal if selected.

* * * * *